US010771867B1

(12) United States Patent
Chemolosov (10) Patent No.: US 10,771,867 B1
(45) Date of Patent: Sep. 8, 2020

(54) VIDEO-GENERATING SYSTEMS AND METHODS

(71) Applicant: Shutterstock, Inc., New York, NY (US)

(72) Inventor: Yuriy Chemolosov, Montreal (CA)

(73) Assignee: Shutterstock, Inc., New York, NY (US)

( * ) Notice: Subject to any disclaimer, the term of this patent is extended or adjusted under 35 U.S.C. 154(b) by 0 days.

(21) Appl. No.: 16/296,940

(22) Filed: Mar. 8, 2019

(51) Int. Cl.
*G06N 20/00* (2019.01)
*G06F 16/78* (2019.01)
*G06F 16/74* (2019.01)
*H04N 21/8549* (2011.01)
*G06F 16/738* (2019.01)

(52) U.S. Cl.
CPC ....... *H04N 21/8549* (2013.01); *G06F 16/739* (2019.01); *G06F 16/743* (2019.01); *G06F 16/7867* (2019.01); *G06N 20/00* (2019.01)

(58) Field of Classification Search
CPC . H04N 21/8549; G06F 16/743; G06F 16/739; G06F 16/7867; G06N 20/00
USPC ......................................................... 386/241
See application file for complete search history.

(56) References Cited

U.S. PATENT DOCUMENTS

| 7,046,850 | B2 | 5/2006 | Braspenning et al. | |
|---|---|---|---|---|
| 7,545,973 | B2 | 6/2009 | Hamanaka | |
| 8,205,227 | B1* | 6/2012 | Del Sesto | H04N 5/76 725/32 |
| 8,935,305 | B2* | 1/2015 | Novak | G06F 16/48 707/822 |
| 9,361,523 | B1* | 6/2016 | Chen | G06K 9/00711 |
| 9,652,534 | B1* | 5/2017 | Narayanan | G06F 16/951 |
| 2013/0031582 | A1* | 1/2013 | Tinsman | H04N 21/2353 725/36 |

OTHER PUBLICATIONS

U.S. Appl. No. 16/183,278, filed Nov. 7, 2018, 59 pages.
U.S. Appl. No. 15/898,161, filed Feb. 15, 2018, 48 pages.
U.S. Appl. No. 15/436,468, filed Feb. 17, 2017 85 pages.

\* cited by examiner

*Primary Examiner* — Thai Q Tran
*Assistant Examiner* — Nienru Yang
(74) *Attorney, Agent, or Firm* — McDermott, Will & Emery LLP (57) ABSTRACT

Various aspects of the subject technology relate to systems, methods, and machine-readable media for video generation. An input video can be provided to a video server that is coupled to a video database storing hundreds, thousands, millions, or billions of video clips. Each stored video clip includes content that is known to the video server. The video server identifies aspects of the content of the input video and identifies matching video clips stored in the video database, using a trained machine-learning engine. The machine-learning engine can also modify some aspects of the input video while maintaining other aspects of the input video.

20 Claims, 8 Drawing Sheets

VIDEO-GENERATING SYSTEMS AND METHODS

BACKGROUND

Field

The present disclosure generally relates to digital video processing, and more particularly to video-generating systems and methods.

Description of the Related Art

Generating a professional-quality video such as a commercial, a movie, a series episode, or other video to be displayed or transmitted on television, in a projection theater, or in a web transmission commonly involves creating a storyboard, hiring professional film crews, hiring actors, performing filming operations in a studio and/or on location, editing, and various other activities. Generating a video in this conventional manner can be prohibitively time-consuming and expensive for both large and small organizations.

SUMMARY

The present disclosure provides a system for automatic replacement of portions of a video stream with stock footage that includes content that either directly corresponds to the content in the input video stream, or corresponds to a modified version of the input video stream. Computer vision and/or other machine-learning models that are appropriately trained can identify and extract the stock footage from a video database based on the input video and/or one or more filters.

For example, a small company in need of a commercial video for the web or for television, and that may not have the financial means to pay for a full commercial production team, can shoot an amateur video of the desired commercial content (e.g., using the camera on their smartphone), submit that amateur video to the disclosed system, and receive back an output video with professional stock footage. The professional stock footage in the output video corresponds to the same style, look, content, and/or storyline of the amateur input video without requiring the user to input any of these features of the input video. In this example, the input video stream is the amateur smartphone video, which is submitted without any filters. This absence of filters results in an output video with content that directly corresponds to the content in the input video stream.

In another example, a company that has paid for, and owns, a professionally produced commercial video can submit that video to the disclosed system along with one or more modifying filters. The system in this example returns an output video in which one or more clips of the input video are replaced with stock video that corresponds to some aspects of the input video and is different from other aspects of the input video, as defined by the filters. For example, a car commercial with content that includes an overhead view of a blue car driving through city streets during daylight hours in the summer can have that content replaced with an overhead view of a red car driving through city streets during daylight hours in the summer, an overhead view of a blue car driving through city streets during night hours in the summer, an overhead view of a blue car driving through rolling green hills during daylight hours in the summer, an overhead view of a blue car driving through snow covered hills during daylight hours in the winter, etc. The selected filters can cause the video-generating system to modify any number of aspects of the input video to create a new output video using video stored in a video database.

As described in further detail hereinafter, computer vision and/or appropriately trained machine-learning models can be used to match and/or modify the objects, actions, tone, color, tempo, cadence, gender, time of day, season, location, theme, and/or other aspects of each clip of an input video stream and/or the overall video stream.

According to some aspects of the present disclosure, a computer-implemented method is provided. The method includes receiving, from a user device, an input video; obtaining video from a video database using a machine-learning engine that is trained to obtain matching video from the video database based on the input video; generating an output video corresponding to the input video by replacing at least a portion of the input video with the obtained video; and providing the output video to the user device.

According to other aspects of the present disclosure, a system is provided that includes a video database storing video clips; one or more processors; and a computer-readable storage medium coupled to the one or more processors, the computer-readable storage medium including instructions. The instructions, when executed by the one or more processors, cause the one or more processors to: receive, from a user device, an input video; obtain at least one of the video clips from the video database using a machine-learning engine that is trained to obtain matching video from the video database based on the input video; and generate an output video corresponding to the input video by replacing at least a portion of the input video with the obtained at least one of the video clip.

According to other aspects of the present disclosure, a non-transitory computer-readable medium is provided including instructions that, when executed by one or more processors, cause the one or more processors to: receive, from a user device, an input video; obtain video from a video database using a machine-learning engine that is trained to obtain matching video from the video database based on the input video; and generate an output video corresponding to the input video by replacing at least a portion of the input video with the obtained video.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Video databases can store stock media such as stock images, stock videos, stock music clips, or the like. Stock video clips from the video databases can be used to replace portions of an existing video stream.

In order to identify the desired stock video clips, in some scenarios, a user may be provided with access to a video server by which text-based searches can be performed for individual stock video clips, one item at a time. An image of a single input clip can also be provided as the search input for a single stock video clip. However, in order to obtain stock video clips for replacement of multiple input video clips, these text-based searches (or even image-based or single-video based searches) can require multiple iterations of searches for each clip to be replaced, in order to find stock video clips that sufficiently correspond to the input clip and that match each other in sequence (e.g., that match in various aspects to create a coherent scene when the clips are played together).

For example, it can be difficult or impossible to perform the number of individual searches that would be required to match the scene aspects (e.g., the season, lighting condition, location, etc.), character aspects (e.g., the ethnicity, gender, age, etc.), animal aspects (e.g., the breed, color, size, etc.), and/or other aspects of each input clip and the overall video stream from tens, hundreds, or thousands of stock video clips that are potential matches for each input clip (e.g., in a search/selection process selecting different scenes for one commercial).

In accordance with aspects of the disclosure, a system is provided that includes a machine-learning model trained to compose a new video sequence based on an input video sequence, such as a commercial or an amateur video sketch. The new video sequence includes stock video clips with content matching (or modifying as desired) any number aspects of the individual video clips of the input video sequence, and of the overall input video sequence itself. The disclosed systems and methods may include video-processing circuitry to decompose an input video stream into individual input clips, a computer-vision engine to recognize objects, actions, and/or other aspects of each input clip, and a trained machine-learning engine that solves the matching problem simultaneously for one or more of the input clips and for the overall input video stream. One or more filters can also be provided to the machine-learning engine to modify one or more of the aspects identified by the computer-vision engine.

In this way, individual operations such as describing components of each scene in detailed text, searching through vast amounts of returned stock footage for each clip, identifying matching scenes, and cutting the scenes into a new video sequence can be reduced or even eliminated, thereby providing a video-generating system that is more efficient than any combination of existing video storage and searching systems.

The system can return a complete replacement video and/or one or more candidate replacement clips, each having the desired replacement aspects, and can be returned for selection by the user. In some scenarios, matching stock music clips can also be provided by system.

Example System Architecture

Figure 1:
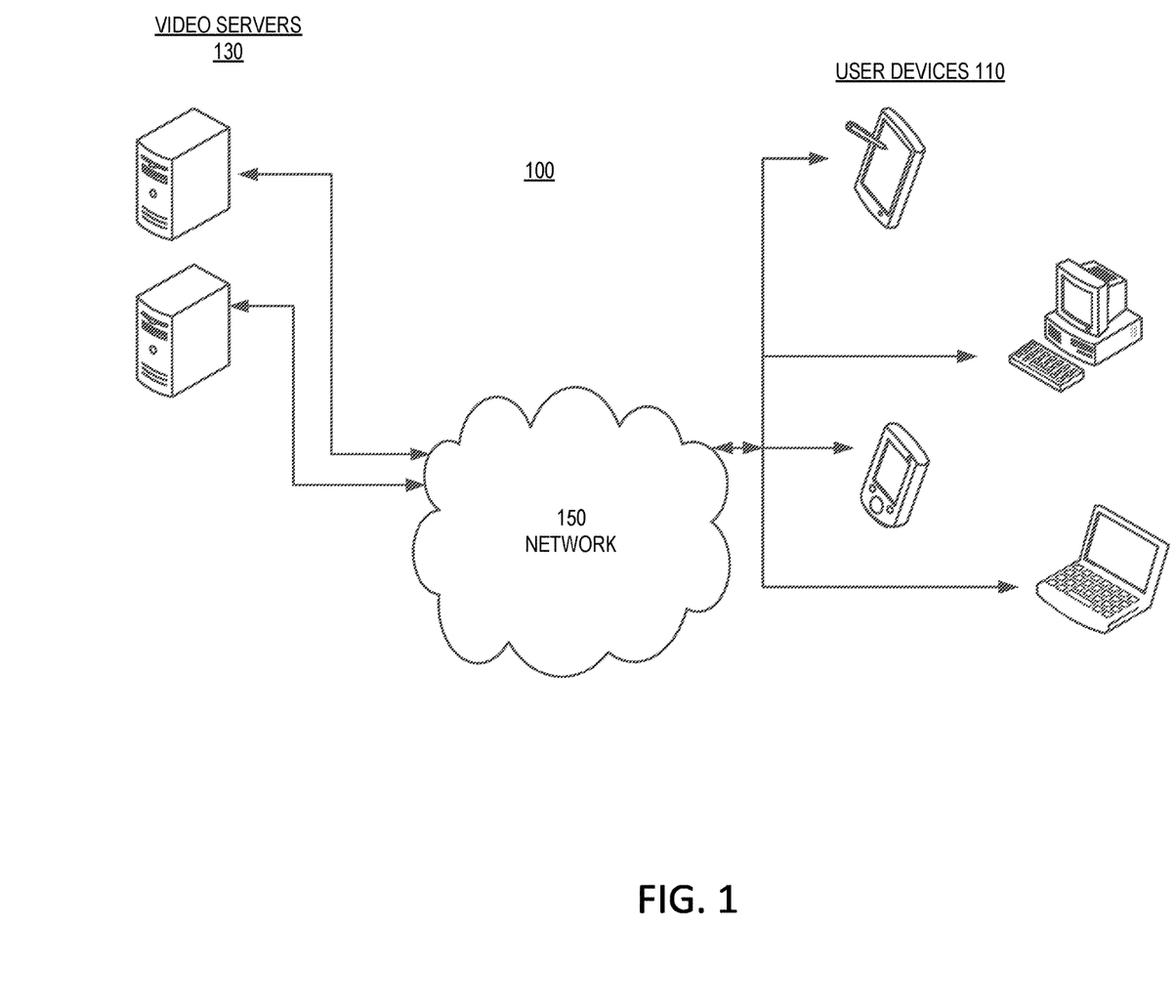
FIG. 1 illustrates an example architecture for practicing some implementations of the disclosure.

FIG. 1 illustrates an example architecture 100 for practicing some implementations of the disclosure. The architecture 100 includes video servers 130 and user devices 110 connected over a network 150.

One or more of video servers 130 is configured to host a machine-learning engine such as a machine-learning engine implementing a computer-operated neural network. The neural network may be trained (e.g., by an operator of video servers 130) to identify stock video clips corresponding to one or more input video clips. One or more of video servers 130 also hosts a collection of stock video clips in a video database. The collection of stock video clips is accessible to distribute the stock video clips to one or more of user devices 110.

As described in further detail hereinafter, video servers 130 are programmed to allow uploading or referring an input video, such as a commercial video or sketch video, from any video hosting device or service, including any of user devices 110. A video server 130 decomposes an input video into clips (e.g., by detecting scenes changes such as by identifying reference frames and associated delta frames, or using other methods to identify scenes). Once the input video is decomposed into input clips, video server 130 uses, for example, computer-vision and/or other machine-learning models to identify objects and actions in the original scenes.

Using, for example, a computer-vision reverse look up operation, video server 130 discovers stock video clips having content that is similar to the identified objects and actions in the input video clips. Video server 130 may then group the discovered stock clips into story lines based on aspects that are common among multiple clips, such as the season or geographical location identified in the input clips. These sequences can be provided to a user device 110 as a complete video, and/or one or more stock video clips can be proposed as options for each input clip to provide the user with the ability to select from the proposed clips to compose a new sequence. Optionally, matching music tracks can be identified and suggested.

Video servers 130 can each be implemented with any device having an appropriate processor, memory, and communications capability for hosting a machine-learning engine, a collection of images, video clips, audio clips, a video processor, and video input and output. User devices 110 can be, for example, desktop computers, mobile computers, tablet computers (e.g., including e-book readers), mobile devices (e.g., a smartphone or PDA), or any other devices having appropriate processor, memory, and communications capabilities for providing input videos and accessing digital media provided by video servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Video Generation Operations

Figure 2:
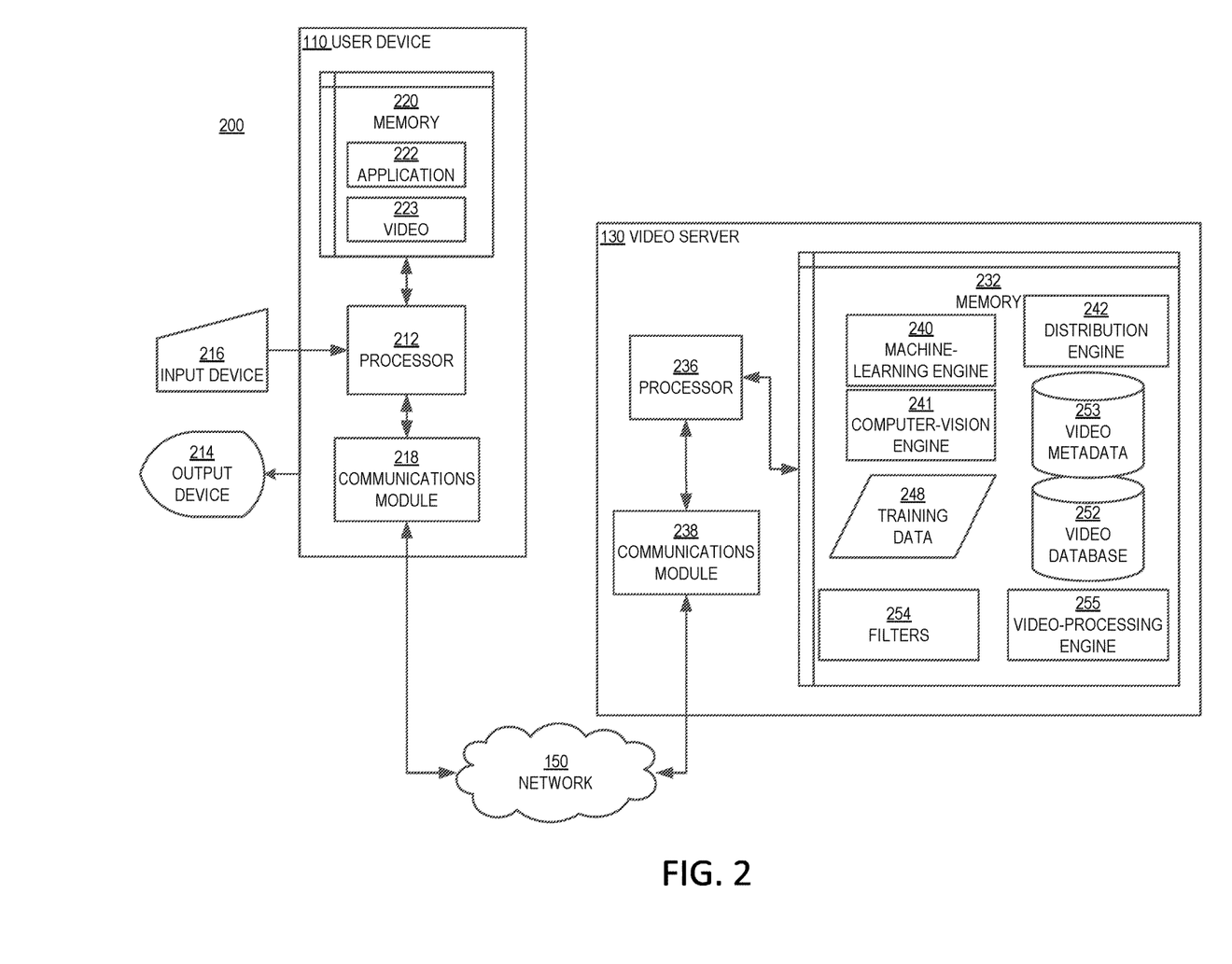
FIG. 2 is a block diagram illustrating an example user device and video server from the architecture of FIG. 1, according to aspects of the disclosure.

FIG. 2 is a block diagram 200 illustrating an example video server 130, and user device 110 in the architecture 100 of FIG. 1, according to certain aspects of the disclosure. The user device 110 and the video server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The user device 110 includes a memory 220, a processor 212, and a communications module 218. As shown, memory 220 may store video 223 (e.g., video transferred to user device 110 or captured by user device 110 such as by using an input device 216 such as a camera of the device). Memory 220 may also store an application 222 such as an interface application for interfacing (e.g., uploading input video and/or downloading output video) with video server 130. User device 110 may include an output device 214 such as a display (e.g., an LCD or LED display) for displaying the interface associated with application 222.

The video server 130 includes a memory 232, a processor 236, and a communications module 238. In the example of FIG. 2, the memory 232 of the video server 130 includes a computer-vision engine 241, a machine-learning engine 240, and a distribution engine 242. Video database 252 stores thousands, hundreds of thousands, millions, or more stock video clips. Each stock video clip in video database 252 may have corresponding video metadata 253 stored in memory 232. Video metadata 253 may include file metadata that describes the format, frame rate, resolution, or other features of the video format and/or may include content metadata that describes the content of the video. For example, each stock video clip in video database 252 may have a corresponding descriptor in video metadata 253. For example, a stock video clip stored in video database 252 may show a scene in which a 70 year old woman walks along a busy, snowy city sidewalk. Video metadata 253 may include a descriptor for that stock video clip of "grey-haired female walking city sidewalk winter". For convenience, various examples are described herein in which video descriptors are text descriptors in a human-readable language. However, it should be appreciated that descriptors can be stored as human-readable descriptors as described in these examples or in other formats such as binary descriptors, or image-based descriptors.

In one or more implementations, machine-learning engine 240 may include a machine-learning model that implements a neural network. For example, the machine-learning model may utilize a deep neural network architecture or other deep-learning architecture. The machine-learning engine 240 may be provided with an input video such as video 223 from user device 110 and/or one or more filters 254 selected by the user.

The machine-learning engine 240 is trained (e.g., prior to receiving the input video and based on training data 248 that is separate from the input video) to identify, based on the provided input video and/or filters, one or more recommended videos from video database 252 that either match various aspects of the input video or that differ from aspects of the input video in accordance with the provided filters 254.

In some implementations, a video-processing engine 255 may decompose the input video into scenes or clips before the video is provided to machine-learning engine 240. For example, video-processing engine 255 may identify each reference frame and its associated delta frames as an input video clip. Video-processing engine 255 can store and/or provide the identified video clips to machine-learning engine 240 separately or can store and provide pointers to the identified clips in the original input video.

Video-processing engine 255 may also combine identified stock video clips from video database 252 into an output video stream to be provided to user device 110. In some operational scenarios, the individual stock video clips (or links thereto) can be provided to the user for combination and sequencing (e.g., at user device 110, such as using a web interface provided by video server 130). For example, each stock video clip identified by machine-learning engine 240 as corresponding to one of the input clips may be provided with a time stamp that corresponds to a time stamp of the input video clip for which that stock video clip was identified. In this way, the user may be provided with one or more optional stock video clips for each input video clip, and the ability to select from these options to generate a final output video.

In some implementations, computer-vision engine 241 may identify objects, actions, and/or other aspects of the input video (or input clips extracted from the input video by video-processing engine 255). The identified objects, actions, and/or other aspects can be provided to machine-learning engine 240 in addition to, or instead of the input video (or input clips). In some operational scenarios, computer-vision engine 241 may generate text descriptors of the identified objects, actions, or other aspects of the input video. The text descriptors may be single word descriptors (e.g., tree, trees, forest, hill, hills, summer, winter, fall, spring, sunshine, cityscape, car, truck, yacht, ship, or dog) that can be combined in a list or table, or may be phrases such as "a man walking a dog by a lake in the morning in springtime". Computer-vision engine 241 is trained to generate descriptors that include terms that are used in the stored descriptors in video metadata 253.

However, because the input video clips are different from the stock video clips in video database 252, the descriptors generated by computer-vision engine 241 are unlikely to exactly match any of the descriptors in video metadata 253 (even if the same individual terms are used in the generated descriptors). Accordingly, in order to match the generated descriptors (and thus the input clips) to the stored descriptors in video metadata 253 (and thus match the input clip to the stock video clip), machine-learning engine 240 can be provided with the descriptors generated by computer-vision engine 241 as input data, and be trained to output one or more matching descriptors in video metadata 253 and/or to rank the existing descriptors in video metadata 253 as potential matches to the generated descriptors.

Machine-learning engine 240 may be trained by modifying known descriptors that correspond to a stored video clip, and providing the modified descriptors as input training data to machine-learning engine 240. The output descriptor that machine-learning engine 240 generates from each modified known descriptor can be compared to the known descriptor to train the model. For example, the exemplary descriptor "grey-haired female walking city sidewalk winter" for the exemplary stock video clip stored in video database 252 that shows a scene in which a 70 year old woman walks along a busy, snowy city sidewalk can be modified to "walking city snow woman" and fed to machine-learning engine 240 as input training data. In this example, machine-learning engine 240 may output a descriptor of "female walking city winter" in a first training run. This output descriptor can be compared to the known (desired) descriptor of "grey-haired female walking city sidewalk winter" and the resulting difference (e.g., a different number of terms, different individual terms, missing terms, or a different order of the terms) can be quantified and used to tune the model (e.g., by tuning parameters such as weights between neurons of a neural network, biases, thresholds, and/or other aspects of the model).

It should also be appreciated that stock video clips that are selected or approved by a user for inclusion in an output video can also be provided, along with the descriptors for the selected stock video clip, the descriptors for the corresponding input clip, and/or the input clip itself, into training data 248 to further train machine-learning engine for later video matching runs.

It should also be appreciated that, in order to ensure continuity of the theme, background, season, lighting, and/or other aspects of the overall output video, some or all of the descriptors (e.g., descriptor terms that are common to two or more clips) for other input clips can be provided to machine-learning engine 240 along with the descriptor for a current input clip when identifying matching stock video clips for the current input clip.

For example, the descriptor for the current input clip may not have a season descriptor (e.g., because computer-vision engine 241 did not identify a season in that particular clip). In this example, if the term "springtime" was included in the descriptors of two or more other input clips, the term "springtime" can be provided to machine-learning engine 240 together with the descriptor for the current clip to ensure that output clips for the current clip are consistent with the output clips for the other input clips. Because the season may be irrelevant in some clips (e.g., for an indoor scene of a video), the training of machine-learning engine 240 ensures that the inclusion of "springtime" does not negatively affect the matching for indoor scenes (e.g., by appropriately weighting descriptor terms from other input clips, such as by generating weights based on the number of other input clips that include that term and/or based on the specific terms for the current clip).

In the examples described above, machine-learning engine 240 is run to identify matching stock video clips for various input video clips. However, as described above, machine-learning engine 240 can also be run to generate videos that differ from the input video as desired by the user. For example, as shown in FIG. 2, memory 232 of video server 130 can store one or more filters 254 that can be selected by the user to modify an input video. Filters can also, in some implementations, be user-generated.

For example, filter 254 may include filters to modify the season, time of day, gender of actor(s), breed of dog(s), geographic location, etc. The filters may be provided to machine-learning engine 240 as additional input terms to accompany the input descriptors or can be used to modify the input descriptors before providing the modified input descriptors to machine-learning engine 240. For example, if a user selects a filter that sets an output season as summer, the descriptor "grey-haired female walking city sidewalk winter" can be modified to "grey-haired female walking city sidewalk summer" (e.g., by replacing all season descriptor terms for all clips with "summer"). In another example, an additional input filter term such as "modify: season(summer)" can be provided to machine-learning engine 240 along with the descriptor "grey-haired female walking city sidewalk winter".

Computer-vision engine 241 may include a differently trained machine-learning model in some implementations. For example, computer-vision engine 241 may include a machine-learning model trained with training data that includes stock video clips as input training data, and known descriptors of the stock video clips as output training data.

Although computer-vision engine 241 and machine-learning engine 240 are depicted as separate components of video server 130, it should be appreciated that the operations of computer-vision engine 241 and machine-learning engine 240 can be combined into a single machine-learning engine. For example, computer-vision engine 241 can be trained (e.g., using a heavy weighting in the model or an output boundary condition) to generate only descriptors that exactly match descriptors of the stock videos in video metadata 253, so that each descriptor that is generated by computer-vision engine 241 specifically identifies a video clip stored in video database 252. In another example, input video clips can be provided directly to machine-learning engine 240 without generating descriptors of identified objects and/or actions. In these scenarios, machine-learning engine 240 matches pixel data of the input video to pixel data of the stock videos in a direct video-to-video mapping.

Stock video clips from video database 252 and/or links thereto that are identified by machine-learning engine 240 and/or computer-vision engine 241 may be provided to user device 110 by distribution engine 242.

Although the set of training data 248 is illustrated in FIG. 2 as being separate from the video database 252, in certain aspects, the set of training data 248 includes a subset of the collection of videos in video database 252. Furthermore, although the video database 252 and the distribution engine 242 are illustrated as being in the same memory 232 of an image server 130 as the machine-learning engine 240, computer-vision engine 241, and video-processing engine 255, in certain aspects, the video database 252 and the distribution engine 242 can be hosted in a memory of a different server but accessible by the video server 130 illustrated in FIG. 2.

The processor 236 of the video server 130 is configured to execute instructions, such as instructions physically coded into the processor 236, instructions received from software in memory 232, or a combination of both. For example, the processor 236 of the video server 130 executes instructions to execute the operations of the computer-vision engine 241, the machine-learning engine 240, the video-processing engine 255, and/or the distribution engine 242 as described herein.

Figure 3:
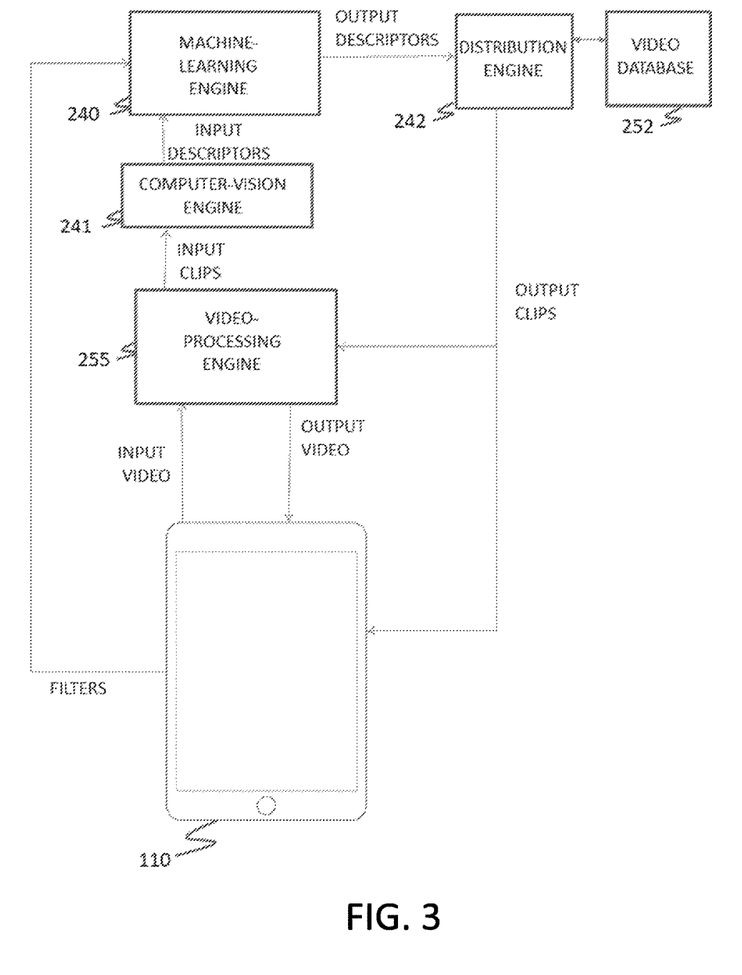
FIG. 3 illustrates a block diagram showing various data exchanges that can be performed for video generation operations, according to aspects of the disclosure.

FIG. 3 illustrates a block diagram showing example communications between portions of video server 130 and user device 110, according to certain aspects of the disclosure. For example, the operations illustrated may be performed to generate an output video from an input video provided to video server 130 from user device 110.

As shown in FIG. 3, user device 110 (e.g., a user's smartphone or tablet in this example) provides an input video to video-processing engine 255 of video server 130.

Video-processing engine 255 extracts one or more input clips from the input video and provides the input clips to computer-vision engine 241.

In this example, computer-vision engine 241 receives the input clips and generates (e.g., based on a trained computer-vision model as described herein) input descriptors for each input clip. The input descriptors may include text-based descriptors of objects, actions, and/or other aspects (e.g., the tone, color, tempo, cadence, gender, time of day, season, location, and/or theme) of each clip and/or of the overall input video (e.g., as detected by computer-vision engine 241). In the example of FIG. 3, the input descriptors generated by computer-vision engine 241 are provided to machine-learning engine 240. In some scenarios, machine-learning engine 240 may also receive one or more filters as described herein (e.g., directly from user device 110, or via selection by user device 110 of stored filters at video server 130).

Machine-learning engine 240, in this example, generates output descriptors corresponding to each input descriptor, and by which stock video clips in video database 252 can be identified. The output descriptors may be modified according to the received filters, if any filters are provided.

The output descriptors may match descriptors in video metadata 253 of FIG. 2. As shown in FIG. 3, the output descriptors may be provided by machine-learning engine 240 to distribution engine 242. Distribution engine 242 obtains the output clips corresponding to the output descriptors from video database 252 and can provide the output clips to user device 110. For example, the output clips can be provided with time stamps corresponding to time stamps of the associated input clips for further processing and/or editing at user device 110. However, FIG. 3 also shows that the output clips can also, or alternatively, be provided to video-processing engine 255. Video-processing engine 255 may combine the output clips into an output video that matches the input video, or that differs from the input video as determined by the filters. The output video may then be provided to user device 110 (e.g., by video-processing engine 255 and/or distribution engine 242).

In the example of FIG. 3, computer-vision engine 241 generates descriptors of each input clip for input (along with any received filters) to machine-learning engine 240. However, as described above in connection with FIG. 2, in some scenarios, output video clips for each input clip can be obtained without generating descriptors.

Figure 4:
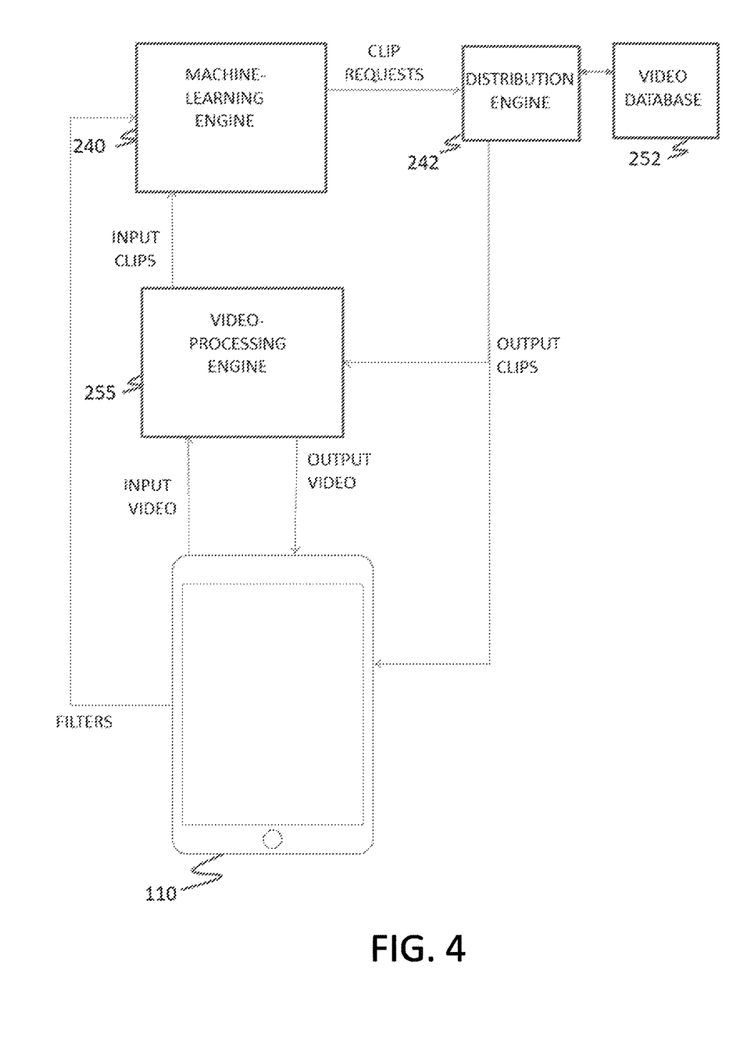
FIG. 4 illustrates another block diagram showing various data exchanges that can be performed for video generation operations, according to aspects of the disclosure.

FIG. 4 illustrates a block diagram showing example communications between portions of video server 130 and user device 110, in an operational scenario in which output video clips for each input clip can be obtained without generating descriptors. For example, the operations illustrated may be performed to generate an output video from an input video provided to video server 130 from user device 110.

As shown in FIG. 4, user device 110 (e.g., a user's smartphone or tablet in this example), provides an input video to video-processing engine 255 of video server 130. Video-processing engine 255 extracts one or more input clips from the input video and provides the input clips to machine-learning engine 240.

In this example, the input clips extracted by video-processing engine 255 are provided directly to machine-learning engine 240. In some scenarios, machine-learning engine 240 may also receive one or more filters as described herein (e.g., directly from user device 110, or via selection by user device 110 of stored filters at video server 130).

Machine-learning engine 240, in this example, generates clip requests corresponding to each input clip, each clip request identifying one or more stock video clips in video database 252. The clip requests may be requests for stock video clips that match one or more aspects of the corresponding input clip and/or that differ from the corresponding input clip according to the received filters, if any filters are provided.

As described above in connection with FIG. 2, in this example, machine-learning engine 240 is trained to identify stock video clips in video database 252 that match the content, objects, actions, tone, season, etc. of the corresponding input clip using the pixel data of the input clip as input data. In this example, machine-learning model 240 has been trained using input video clips as input training data, and desired output clips (e.g., having the desired matching content) as output training data.

As shown in FIG. 4, the clip requests may be provided by machine-learning engine 240 to distribution engine 242. Distribution engine 242 obtains the output clips corresponding to the clip requests from video database 252 and can provide the obtained output clips to user device 110. For example, the output clips can be provided with time stamps corresponding to time stamps of the associated input clips for further video-processing and/or editing at user device 110. However, FIG. 4 also shows that the output clips can also, or alternatively, be provided to video-processing engine 255. Video-processing engine 255 may combine the output clips into an output video that matches the input video, or that differs from the input video as determined by the filters. The output video may then be provided to the user device (e.g., by video-processing engine 255 and/or distribution engine 242).

Figure 5:
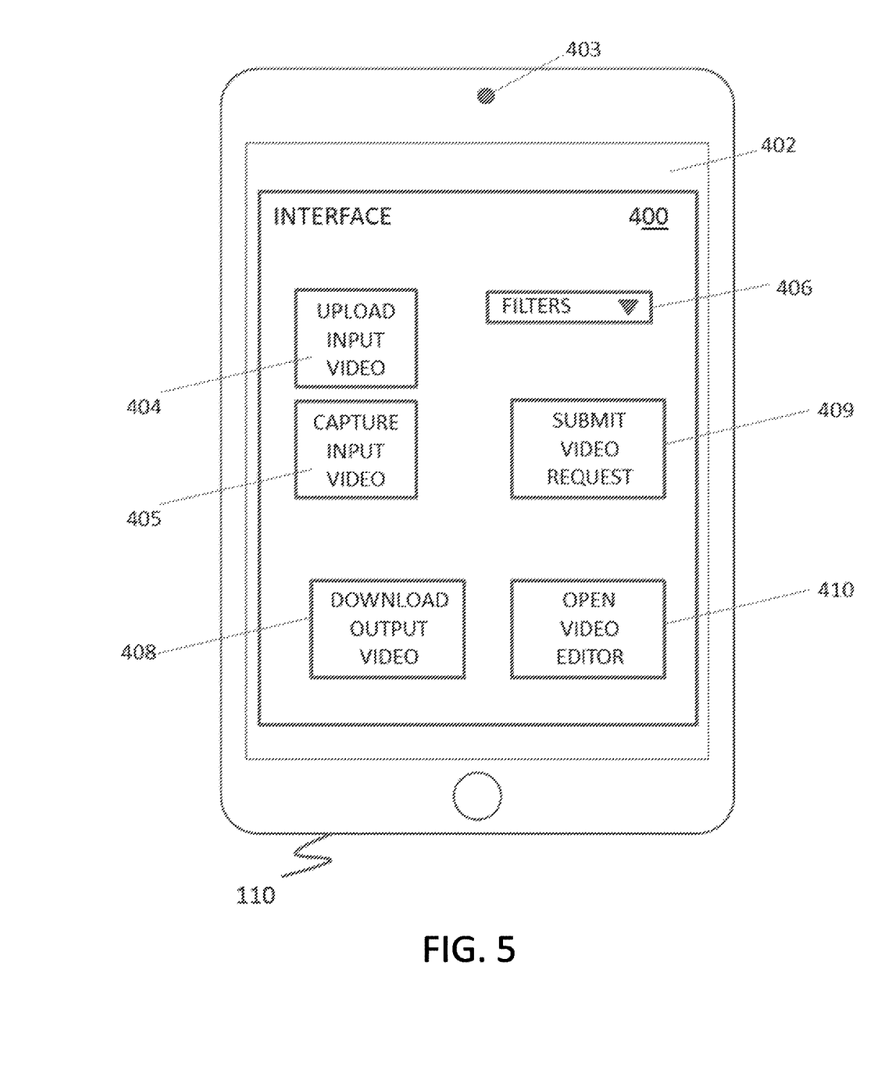
FIG. 5 illustrates an example graphical user interface for video generation, according to certain aspects of the disclosure.

FIG. 5 illustrates an example of a graphical user interface that may be provided in accordance with aspects of the subject disclosure. In the example of FIG. 5, the interface 400 (e.g., a downloadable application or a web-based interface) is displayed on display 402 of user device 110.

In the example of FIG. 5, interface 400 includes a selectable option 404 to upload an input video. For example, selecting option 404 may cause user device 110 to provide browsing access to one or more video files stored at user device 110. For example, the video files may have been previously stored at user device 110 and/or generated using one or more cameras, such as camera 403 of user device 110. If desired, the user can instead select an option 405 to capture input video in real time (e.g., by operating one or more cameras such as camera 403 of user device 110 via interface 400).

FIG. 5 also shows how interface 400 can provide filter options 406 (e.g., selectable filters in a drop-down menu) to a user of user device 110. Although a drop-down menu is depicted, other filter input options can be provided (e.g., a text-input field for input of user-defined filters).

Once the input video and/or any desired filters have been identified, the user can select option 409 to submit a video request to video server 130. Selection of submission option 409 causes user device 110 to transmit the input video and/or any identified filters to video server 130 (e.g., using communications module 218).

Following submission of the video request, video server 130 may perform the video generation operations described above in connection with FIGS. 2, 3, and/or 4 (as examples) to generate an output video. Interface 400 may provide a notification (e.g., a push notification, or a notification when the user opens the interface) when video server 130 has generated the output video. As indicated in FIG. 5, interface 400 may also provide a selectable option 408 to download the output video generated by video server 130. Selecting option 408 may allow the user to download a completed output video, or one or more time-stamped output video clips from video server 130.

Interface 400 may also include a selectable option 410 to open a video editor. Selecting option 410 may activate another portion of interface 400 and/or a new interface by which a user of user device 110 can edit the output video (e.g., by selecting output clips for replacement of various input clips and/or by otherwise editing a complete output video). The output video and/or output video clips can be stored at user device 110 and/or at video server 130 for editing using the video editor accessed with option 410. Selectable options 408 and/or 410 may appear in interface 400, or may be activated in the interface, responsive to completion of the video obtaining operations of the machine-learning engine of video server 130.

Figure 6:
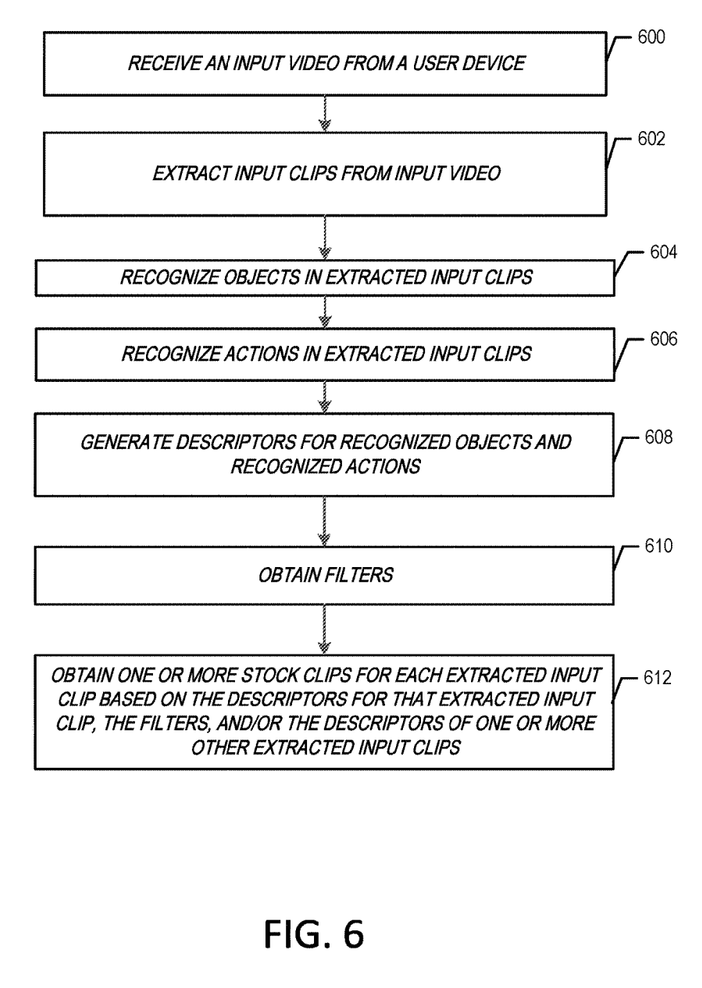
FIG. 6 illustrates an example process for video generation, according to aspects of the disclosure.

FIG. 6 illustrates a flow diagram of an example process for generating an output video based on an input video, in accordance with one or more implementations. For explanatory purposes, the process of FIG. 6 is primarily described herein with reference to one or more devices of FIGS. 1 and 2 (particularly with reference to video server 130), which may be executed by one or more processors of the server 130 of FIGS. 1 and 2. However, the process of FIG. 6 is not limited to the server 130, and one or more blocks (or operations) of the process may be performed by one or more other components of other suitable devices. Further for explanatory purposes, the blocks of the process of FIG. 6 are described herein as occurring in serial, or linearly. However, multiple blocks of the process of FIG. 6 may occur in parallel. In addition, the blocks of the process of FIG. 6 need not be performed in the order shown and/or one or more blocks of the process of FIG. 6 need not be performed and/or can be replaced by other operations.

In the illustrated example, at block 600, video server 130 receives an input video from a user device, such as user device 110. The input video may be an amateur video captured using the camera on the user device itself, another amateur video, or a professionally-produced video such as a commercial for television, web-transmission, or the like.

At block 602, video server 130 (e.g., video-processing engine 255) may extract one or more input clips from the received input video. Extracting the input clips may include identifying an input clip for each of a plurality of reference frames and its delta frames in an input video stream.

At block 604, video server 130 (e.g., computer-vision engine 241) may recognize one or more objects in each of the extracted video clips. For example, computer-vision engine 241 may be trained to identify male or female humans, animals, furniture, sporting equipment, plants, bushes, trees, windows, streets, hills, and/or any other objects that can be captured in a video.

At block 606, video server 130 (e.g., computer-vision engine 241) may recognize one or more actions in each of the extracted video clips. For example, computer-vision engine 241 may be trained to identify actions such as driving, running, walking, jumping, throwing, catching, eating, drinking, flying, falling, tripping, and/or any other action performed by a person, animal, or object that can be captured in a video.

At block 608, video server 130 (e.g., computer-vision engine 241) may generate a descriptor for each input clip (e.g., based on the identified objects and/or actions). As described above in connection with, for example, FIG. 2, the descriptors may be text-based descriptors (e.g., words, groups of words, and/or phrases) or other descriptors.

At block 610, video server 130 may obtain one or more filters. For example, a user of user device 110 may select one or more filters from filter options 406 of FIG. 5. Filters may be selected to modify one or more aspects of the input video (e.g., to change the season, the lighting, the gender, the age, or any other aspect of one or more portions of the input video).

At block 612, video server 130 obtains one or more stock clips (e.g., from video database 252 using machine-learning engine 240) for each extracted input clip based on the descriptors for that extracted input clip, the filters, and/or the descriptors of one or more other extracted input clips. For example, it should be appreciated that, to maintain a consistent tone across all stock clips, descriptors of one or more other clips can be used in identifying matching stock clips for any particular input clip.

Obtaining the stock video clips may include identifying, for each input clip, a corresponding stock video clip that is stored in the video database 252 using the machine-learning engine 240 by providing the input descriptor for each clip to the machine-learning engine 240. Obtaining the stock video clips may include generating, with the machine-learning engine 240, an output descriptor for each input descriptor, where each output descriptor has at least one matching output descriptor that is associated with the corresponding output video clip.

When filters are provided, obtaining the stock video clips may include receiving a filter from the user device 110, providing the filter to the machine-learning engine 240, and identifying the stock video clips with the machine-learning engine 240 based on the filter and the input video. In this scenario, the output video matches at least one aspect of the input video and differs from at least another aspect of the input video according to the filter.

Once the stock clips have been obtained, the stock clips can be provided individually to the user device 110 and/or combined into a complete output video corresponding to the input video (e.g., corresponding directly or with some aspects modified according to the received filters). Combining the stock clips into an output video may include replacing at least a portion of the input video with the obtained stock video clips.

Prior to receiving the input video (at block 600), machine-learning engine 240 is trained to obtain the matching stock video from the video database based on the input video as described herein.

Figure 7:
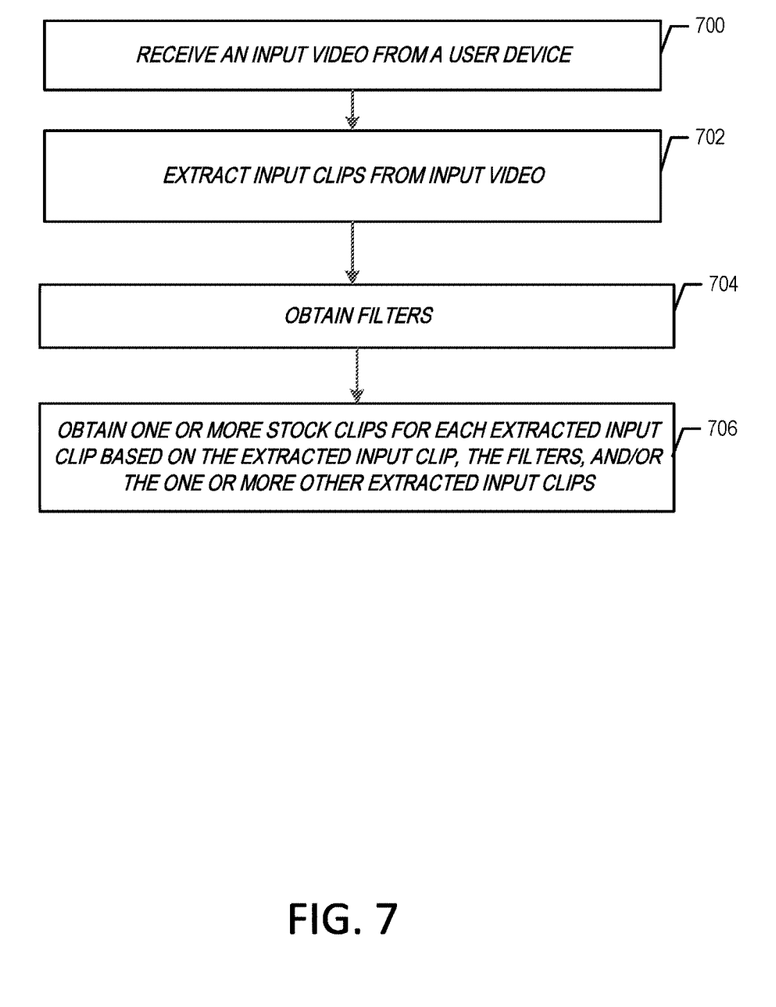
FIG. 7 illustrates another example process for video generation, according to aspects of the disclosure.

FIG. 7 illustrates a flow diagram of another example process for generating an output video based on an input video, in accordance with one or more implementations. In the example processes of FIG. 6, a computer-vision engine is used to generate descriptors for each of several input clips. However, FIG. 7 provides an example process for obtaining stock video clips for each of several input clips without generating descriptors. For explanatory purposes, the process of FIG. 7 is primarily described herein with reference to one or more devices of FIGS. 1 and 2 (particularly with reference to video server 130), which may be executed by one or more processors of the video server 130 of FIGS. 1 and 2. However, the process of FIG. 7 is not limited to the server 130, and one or more blocks (or operations) of the process may be performed by one or more other components of other suitable devices. Further for explanatory purposes, the blocks of the process of FIG. 7 are described herein as occurring in serial, or linearly. However, multiple blocks of the process of FIG. 7 may occur in parallel. In addition, the blocks of the process of FIG. 7 need not be performed in the order shown and/or one or more blocks of the process of FIG. 7 need not be performed and/or can be replaced by other operations.

In the illustrated example, at block 700, video server 130 receives an input video from a user device such as user device 110. The input video may be an amateur video captured using the camera on the user device itself, another amateur video, or a professionally-produced video such as a commercial for television, web-transmission, or the like.

At block 702, video server 130 (e.g., video-processing engine 255) may extract one or more input clips from the received input video. Extracting the input clips may include identifying an input clip for each of a plurality of reference frames and its delta frames in an input video stream.

At block 704, video server 130 may obtain one or more filters. For example, a user of user device 110 may select one or more filters from filter options 406 of FIG. 5. Filters may be selected to modify one or more aspects of the input video (e.g., to change the season, the lighting, the gender, the age, or any other aspect of one or more portions of the input video).

At block 706, video server 130 obtains one or more stock clips (e.g., from video database 252 using machine-learning engine 240) for each extracted input clip based on the extracted input clip, the filters, and/or one or more other extracted input clips. For example, it should be appreciated that, to maintain a consistent tone across all stock clips, one or more other clips and/or one or more features of one or more other input clips can be used in identifying matching stock clips for any particular input clip.

Once the stock clips have been obtained, the stock clips can be provided individually to the user device 110 and/or combined into a complete output video corresponding to the input video (e.g., corresponding directly or with some aspects modified according to the received filters). Combining the stock clips into an output video may include replacing at least a portion of the input video with the obtained stock video clips.

Prior to receiving the input video (at block 700), machine-learning engine 240 is trained to obtain the matching stock video from the video database based on the input video as described herein.

The present disclosure provides a system for generating professional-quality videos using vast databases of stock video clips, based on trained machine-learning engine matching of the stock video clips with clips of an input video provided by a user. In this way, a video-generating system is provided that is more than additively more efficient than any combination of existing video storage and searching systems.

Hardware Overview

Figure 8:
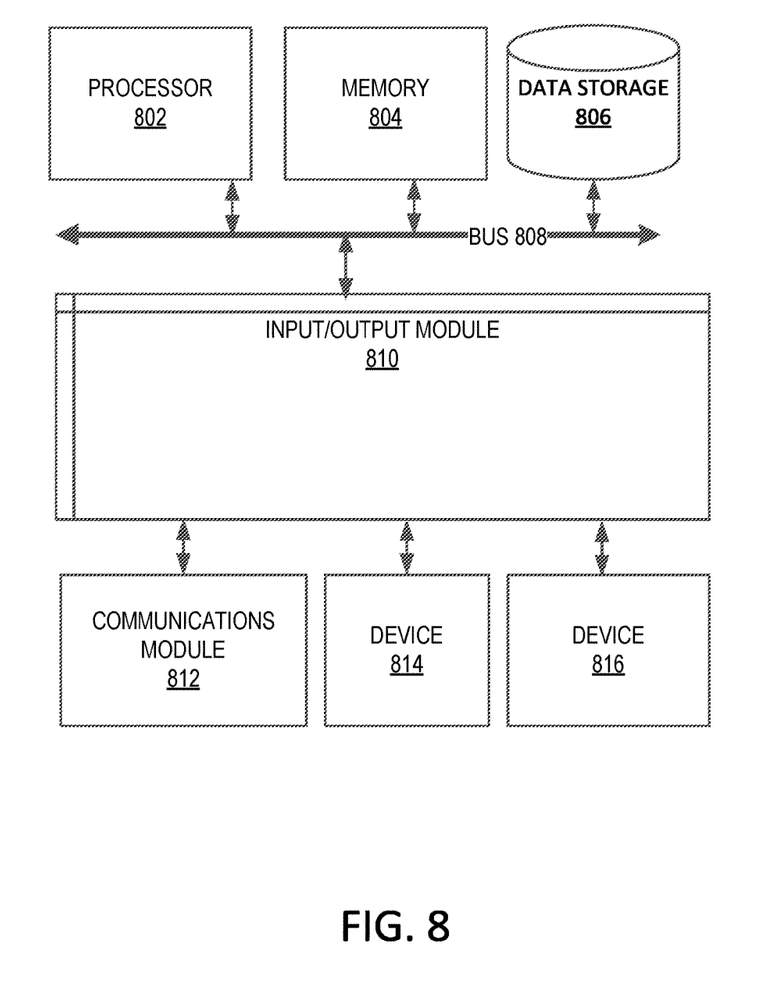
FIG. 8 is a block diagram illustrating an example computer system with which the user device and/or video server of FIG. 2 can be implemented.

FIG. 8 is a block diagram illustrating an exemplary computer system 800 with which the user devices 110 and/or one or more of video servers 130 of FIG. 1 can be implemented. In certain aspects, the computer system 800 may be implemented using hardware or a combination of software and hardware, either in a dedicated server, or integrated into another entity, or distributed across multiple entities.

Computer system 800 includes a bus 808 or other communication mechanism for communicating information, and a processor 802 (e.g., an implementation of processor 212 or 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 220 or 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 (e.g., communications modules 218 or 238) include networking interface cards, such as Ethernet cards and modems. In certain aspects, the input/output module 810 is configured to connect to a plurality of devices, such as an input device 814 (e.g., input device 216) and/or an output device 816 (e.g., output device 214). Exemplary input devices 814 include a keyboard and a pointing device (e.g., a mouse or a trackball), by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a LCD (liquid crystal display) monitor, for displaying information to the user.

According to one aspect of the present disclosure, user device 110 and/or video servers 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component (e.g., as a data server), or that includes a middleware component (e.g., an application server), or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication (e.g., a communication network). The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box. Computer system 800 can be a server such as one of video servers 130. However, it should be appreciated that the operations described herein as being performed by a video server 130 can, in various implementations, be performed by a network of video servers 130 in a cloud computing architecture. Additional cloud servers implementing one or more of the components of computing system 800 can also be used, in some implementations, to perform operations described herein as being performed locally by a user device 110. For example, a camera and processor of user device 110 can be used to capture an input video that is subsequently stored in remote cloud storage associated with a user account of the user of that user device 110. The user device 110 can then provide the input video to video server(s) 130 by downloading the input video to memory of the user device before transmitting the input video to the video server(s) or by providing the video server(s) with direct access to the cloud-stored input video (as examples).

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, a floppy disk, a flexible disk, a hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving, from a user device, an input video;
obtaining video from a video database using a machine-learning engine that is trained to obtain a matching video from the video database based on the input video;
generating an output video corresponding to the input video by replacing at least a portion of the input video with the matching video;
providing the output video to the user device;
identifying the video with the machine-learning engine based on a filter and the input video, wherein the output video matches at least one aspect of the input video and differs from at least another aspect of the input video according to the filter;
extracting a plurality of input clips from the input video;
identifying, for each input clip, a corresponding video clip that is stored in the video database using the machine-learning engine; and
matching the corresponding video clip in a sequence of corresponding video clips, to form a coherent scene in an output video by weighting, in the corresponding video clip, a descriptor based on a number of input clips that include the descriptor.

2. The computer-implemented method of claim 1, further comprising:
receiving the filter from the user device; and
providing the filter to the machine-learning engine.

3. The computer-implemented method of claim 1, further comprising matching a music track to form the coherent scene in the output video.

4. The computer-implemented method of claim 3, wherein providing the output video to the user device comprises providing one or more output video clips to the user device for each input video clip.

5. The computer-implemented method of claim 4, further comprising generating an input descriptor for each input clip, wherein obtaining the video comprises identifying, for each input clip, a corresponding output video clip that is stored in the video database using the machine-learning engine by providing the input descriptor for each clip to the machine-learning engine.

6. The computer-implemented method of claim 5, wherein obtaining the video further comprises generating, with the machine-learning engine, an output descriptor for each input descriptor, wherein each output descriptor has at least one matching output descriptor that is associated with the corresponding output video clip.

7. The computer-implemented method of claim 1, further comprising training the machine-learning engine to obtain the matching video from the video database based on the input video.

8. A system, comprising:
a video database storing video clips;
one or more processors; and
a computer-readable storage medium coupled to the one or more processors, the computer-readable storage medium including instructions that, when executed by the one or more processors, cause the one or more processors to:
receive, from a user device, an input video;
obtain a video clip from the video database using a machine-learning engine that is trained to obtain a matching video from the video database based on the input video;
generate an output video corresponding to the input video by replacing at least a portion of the input video with the video clip;
identify, based on a filter and the input video, the output video with the machine-learning engine, wherein the output video matches at least one aspect of the input video and differs from at least another aspect of the input video according to the filter;
extract a plurality of input clips from the input video;
identify, for each input clip, a corresponding video clip that is stored in the video database using the machine-learning engine; and
match the corresponding video clip in a sequence of corresponding video clips, to form a coherent scene in an output video by weighting, in the video clip, a descriptor based on a number of input clips that include the descriptor.

9. The system of claim 8, wherein the instructions, when executed by the one or more processors, further cause the one or more processors to extract a plurality of input clips from the input video and provide the input clips to the machine-learning engine.

10. The system of claim 9, wherein the instructions, when executed by the one or more processors, further cause the one or more processors to receive a filter from the user device and provide the filter to the machine-learning engine with the input clips.

11. The system of claim 10, wherein the instructions, when executed by the one or more processors, further cause the one or more processors to obtain at least one of the video clips by, with the machine-learning engine, identifying one of the video clips from the video database that matches a first aspect of one of the input clips and differs from a second aspect of the one of the input clips.

12. The system of claim 11, wherein the one of the video clips differs from the second aspect of the one of the input clips according to the filter.

13. The system of claim 8, wherein the instructions, when executed by the one or more processors, further cause the one or more processors to provide a plurality of selectable filters to the user device.

14. The system of claim 8, wherein the instructions, when executed by the one or more processors, further cause the one or more processors to provide a video editor to the user device for editing of the output video.

15. The system of claim 8, wherein the computer-readable storage medium further stores video metadata for each of the video clips stored in the video database, and wherein the video metadata for each video clip includes a descriptor of content in that video clip.

16. The system of claim 8, wherein the instructions, when executed by the one or more processors, further cause the one or more processors to train the machine-learning engine, prior to receiving the input video from the user device and based on training data that is different from the input video, to obtain various matching videos from the video database based on various corresponding input videos.

17. A non-transitory computer-readable medium including instructions that, when executed by a processor, cause a computer to:
receive, from a user device, an input video;
obtain, using a machine-learning engine and a video databases matching video from the video database that matches the input video;
generate an output video based on a matching video;
identify the output video based on a filter, wherein the output video matches at least one aspect of the input video and differs from a second aspect, according to the filter;
extract a plurality of input clips;
identify, in the video database, and for each input clip, a corresponding video clip; and
match the corresponding video clip in a sequence of corresponding video clips, to form a coherent scene in an output video by weighting, in the corresponding video clip, a descriptor based on a number of input clips that include the descriptor.

18. The non-transitory computer-readable medium of claim 17, wherein the output video is configured to match a plurality of aspects.

19. The non-transitory computer-readable medium of claim 18, wherein the output video differs from at least one additional aspect according to the filter.

20. The non-transitory computer-readable medium of claim 17, wherein the instructions, when executed by the processor, further cause the computer to train the machine-learning engine to obtain the matching video from the video database based on the input video.

\* \* \* \* \*